3,103,509
PRODUCTION OF LACTAMS
Otto von Schickh, Ludwigshafen (Rhine), Germany, assignor to Badische Anilin- & Soda-Fabrik Aktiengesellschaft, Ludwigshafen (Rhine), Germany
No Drawing. Filed May 9, 1961, Ser. No. 108,750
Claims priority, application Germany May 13, 1960
11 Claims. (Cl. 260—239.3)

This invention relates to the production of lactams, especially the production of piperidone and caprolactam.

For the production of caprolactam on an industrial scale only those processes have hitherto gained importance in which cyclohexanone oxime is converted into caprolactam by Beckmann rearrangement. The technical difficulties of this rearrangement are known. It is especially the formation of large amounts of neutral salt which is attended by disadvantages.

Pyrrolidone is obtained technically from butyrolactone and ammonia. This method is generally applicable to the production of lactams from lactones. Various derivatives of ω-hydroxycarboxylic acids or of ω-halogencarboxylic acids have been reacted with ammonia to form lactams, as for example ω-hydroxycarboxylic acid esters, ω-hydroxycarboxylic acid amides, and ω-halogencarboxylic acid amides. ω-Hydroxycarboxylic acids or ω-halogencarboxylic acids have also been reacted with ammonia to form lactams. It is further known that lactams can be prepared from free ω-aminocarboxylic acids, their esters or amides.

Methods are also known for preparing lactams from ω-aminonitriles by heating with water or from ω-halogennitriles by heating with aqueous ammonia.

The importance of all these methods depends largely on the accessibility of the initial materials. In some of the said methods, the yields are only moderate or long reaction periods are necessary.

It is an object of this invention to provide a process for the production of lactams or N-substituted lactams in which compounds are used as initial materials which have not hitherto been used for this purpose.

Another object of the invention is a process for the production of lactams that gives high yields and high space-time yields.

In accordance with the present invention, the said objects and advantages are achieved by reacting an ω-hydroxyfatty acid nitrile with a nitrogenous compound of the general formula $NH_2—R$, in which R denotes a hydrogen atom, an alkyl, cycloalkyl, aryl or aralkyl radical or an aminoalkyl group, if desired in aqueous solution, at a temperature of about 200° to 350° C. and at increased pressure.

Suitable ω-hydroxyfatty acid nitriles are those with four to eight carbon atoms in the molecule, especially those with four to six carbon atoms. Examples are γ-hydroxybutyronitrile, δ-hydroxyvaleronitrile, ε-hydroxycaproic acid nitrile, ω-hydroxycaprylic acid nitrile, γ-hydroxy-β-methyl-butyronitrile, and ε-hydroxy-γ-methylcaproic acid nitrile.

ω-Hydroxynitriles are obtained, for example, by reaction of ω-halogen alcohols with alkali cyanides. They are also formed as byproducts in the reaction of α,ω-dihalogenalkanes with alkali cyanides to α,ω-alkane dinitriles in aqueous alkaline solution.

When using ammonia, lactams are obtained and when using primary amines, N-substituted lactams are obtained. Alkyl amines, especially those with one to twelve carbon atoms, cycloalkyl amines, especially those with five to twelve carbon atoms in the ring, aryl amines, especially aniline and homologs, and aralkyl amines, especially those with an aromatic mononuclear ring and an alkyl radical with 1 to 4 carbon atoms, may be used as primary amines.

Examples of amines which may be used are methylamine, ethylamine, n-propylamine, isopropylamine, n-butylamine, n-hexylamine, n-octylamine, n-dodecylamine, cyclopentylamine, cyclohexylamine, methylcyclohexylamines, cyclooctylamine, cyclododecylamine, aniline, toluidine, xylidine, benzylamine and β-phenylethylamine.

Diamines may also be used. When they contain two primary amino groups, bis-lactams are obtained. The preferred diamines are those containing 2 to 12 carbon atoms. Examples are ethylene diamine, 1,4-tetramethylene diamine and 1,6-hexamethylene diamine.

The ammonia or primary amine is used in excess. I prefer to use 1.2 to 10 times the molar amount. The ammonia or amine may be used as such, but I prefer to use them in aqueous solution or in the presence of water if the amines are not miscible with water. The amount of water used is not critical. The proportion by weight of the ω-hydroxyfatty acid nitrile to water is in most cases from 1:1 to 1:15, but it may also be larger.

The reaction is carried out by heating the reactants to 200° to 350° C., especially 280° to 310° C., at the pressure formed by heating the reactants to this temperature in a closed vessel, i.e. at about 50 atmospheres to 150 atmospheres. It will be understood that it is also possible to work at a higher pressure than that set up by the liquid constituents at the reaction temperature, for example by forcing in an inert gas, such as nitrogen.

The reaction period depends on the nature of the components to be reacted and is usually about one to ten hours.

The process may be carried out discontinuously, for example in an autoclave, or continuously by leading the hydrofatty acid nitrile, ammonia or amine and, if desired, water through an appropriately heated tube system.

The reaction mixture is in general worked up by distillation, by first distilling off the amine or ammonia and water, if any, at normal pressure and purifying the remaining lactam by distillation under reduced pressure.

The lactams are obtained in good yields and high purity.

The lactams which are not substituted on the nitrogen atom can be processed into polyamides in conventional manner. The N-substituted lactams may be used as solvents, as catalytically active additives and as intermediates.

The invention is illustrated by, but not limited to, the following examples. The parts specified in the examples are parts by weight.

*Example 1*

25 parts of δ-hydroxyvaleronitrile are heated in an autoclave with 60 parts of concentrated aqueous ammonia (30% $NH_3$) and 60 parts of water for two hours at 300° C. 22 parts of piperidone (boiling point at 15 mm. Hg: 140° to 145° C.; 88% yield) are obtained.

*Example 2*

25 parts of γ-hydroxybutyronitrile are heated in an autoclave with 250 parts of concentrated aqueous ammonia (30% NH₃) for 4 hours at 300° C., a pressure of 130 atmospheres being set up. The excess of aqueous ammonia is distilled off at normal pressure and the residue separated by vacuum distillation. 22 parts of α-pyrrolidone are obtained (boiling point at 11 mm. Hg: 124° to 126° C.; 88% yield).

*Example 3*

50 parts of ε-hydroxycapronitrile are heated in an autoclave with 500 parts of concentrated aqueous ammonia (30% NH₃) for 4 hours at 350° C. 25 parts of caprolactam are obtained (boiling point at 15 mm. Hg: 145° to 148° C.)

*Example 4*

980 parts of 4-hydroxyvaleronitrile are heated with 4700 parts of 30% aqueous methylamine solution in a pressure vessel for 4 hours at 300° C., a pressure of 160 atmospheres' gauge being set up. After cooling, the excess aqueous methylamine is distilled off and can be used in a fresh batch. The residue is distilled in vacuo and gives 962 parts of N-methylpiperidone (boiling point at 15 mm. Hg: 100° to 103° C.; 87% yield).

*Example 5*

320 parts of 4-hydroxyvaleronitrile are heated with 2240 parts of a 35% aqueous ethylamine solution in a pressure vessel for ten hours at 300° C. By working up as described in Example 1, 343 parts of N-ethylpiperidone are obtained (boiling point at 17 mm. Hg: 109° to 110° C.; 83.5% yield).

*Example 6*

200 parts of 4-hydroxyvaleronitrile are heated with 760 parts of n-butylamine and 1520 parts of water in a pressure vessel for ten hours at 300° C. By working up as described in Example 1, 278 parts of N-butylpiperidone are obtained (boiling point at 15 mm. Hg: 131° to 133° C.; 86% yield).

*Example 7*

200 parts of 4-hydroxyvaleronitrile are heated with 960 parts of aniline and 1920 parts of water in a pressure vessel for ten hours at 300° C. After cooling, the reaction mixture is distilled in vacuo. After distilling off water and unreacted aniline, 382 parts of N-phenylpiperidone are obtained (boiling point at 0.4 mm. Hg: 122° to 161° C.; 61% yield). The product solidifies in crystalline form upon cooling. After recrystallization from cyclohexane it has a melting point of 102° to 103° C.

When using p-toluidine instead of aniline, N-p-tolylpiperidone (melting point 87° to 88° C.) is obtained in a 60.4% yield in an analogous way.

*Example 8*

200 parts of 4-hydroxyvaleronitrile are heated with 126 parts of 1,6-hexamethylene diamine and 1000 parts of water for ten hours in a pressure vessel at 300° C., a pressure of 115 atmospheres' gauge being set up. After cooling, the reaction solution is fractionally distilled. By distilling off the water and unreacted hexamethylene diamine, 131 parts of 1,6-hexamethylene-N,N'-dipiperidone are obtained (boiling point at 0.6 mm. Hg: 220 to 228° C.; 46% yield).

1,2-ethylene-N,N'-dipiperidone (boiling point at 0.3 mm. Hg: 151° to 156° C.) is obtained in an analogous way from 1,2-ethylene diamine and 4-hydroxyvaleronitrile.

*Example 9*

25 parts of 4-hydroxyvaleronitrile, 120 parts of benzylamine and 240 parts of water are heated for ten hours in a pressure vessel at 300° C., a pressure of about 110 atmospheres being set up. By working up as described in Example 8, 31 parts of N-benzylpiperidone are obtained (melting point 116° to 118° C.; yield 65% of the theory).

32 parts (70% of the theory) of N-cyclohexyl-piperidone are obtained under otherwise identical conditions by using 120 parts of cyclohexylamine instead of benzylamine.

*Example 10*

A mixture of 25 parts of 4-hydroxyvaleronitrile and 50 parts of liquid ammonia is heated in an autoclave for 10 hours at 300° C., a pressure of 140 atmospheres being set up. The residue obtained by cooling and decompression is distilled and gives 11 parts (45% of the theory) of α-piperidone.

*Example 11*

A mixture of 25 parts of γ-hydroxybutyronitrile, 120 parts of aniline and 240 parts of water is heated in an autoclave for 10 hours at 300° C., a pressure of 120 atmospheres being set up. The reaction mixture is cooled and then fractionally distilled. 31 parts (65% of the theory) of N-phenylpyrrolidone (boiling point at 0.4 mm. Hg: 127° to 130° C.; melting point 62° to 63° C.) are obtained.

I claim:

1. A method of preparing lactams which comprises reacting an ω-hydroxyfatty acid nitrile having 4 to 8 carbon atoms with an excess of a compound of the formula NH₂—R, wherein R is a member selected from the group consisting of hydrogen, alkyl of 1 to 12 carbon atoms, cycloalkyl of 5 to 12 carbon atoms, aryl of 6 to 8 carbon atoms, aralkyl of 7 to 10 carbon atoms and aminoalkyl of 2 to 12 carbon atoms, at an increased pressure and a temperature from about 200° to 350° C.

2. A method of preparing lactams comprising reacting an ω-hydroxyfatty acid nitrile having from 4 to 8 carbon atoms with an excess of a compound of the formula NH₂—R, wherein R is a member selected from the group consisting of hydrogen, alkyl of 1 to 12 carbon atoms, cycloalkyl of 5 to 12 carbon atoms, aryl of 6 to 8 carbon atoms and aralkyl of 7 to 10 carbon taoms and aminoalkyl of 2 to 12 carbon atoms, in the presence of water, at an increased pressure and a temperature from about 200° to 350° C.

3. The method of preparing lactams as claimed in claim 2, wherein the compound of the formula NH₂—R is ammonia.

4. The method of preparing lactams as claimed in claim 2, wherein the compound of the formula NH₂—R is ammonia.

5. The method of preparing N-substituted lactams as claimed in claim 1, wherein the compound of the formula NH₂—R is a primary alkylamine of 1 to 12 carbon atoms.

6. The method of preparing N-substituted lactams as claimed in claim 2, wherein the compound of the formula NH₂—R is a primary alkylamine of 1 to 12 carbon atoms.

7. The method of preparing N-substituted lactams as claimed in claim 1, wherein the compound of the formula NH₂—R is a diamine containing two primary amino groups on a hydrocarbon chain of 2 to 12 carbon atoms.

8. The method of preparing N-substituted lactams as claimed in claim 2, wherein the compound of the formula NH₂—R is a diamine containing two primary amino groups on a hydrocarbon chain of 2 to 12 carbon atoms.

9. The method of preparing N-substituted lactams as claimed in claim 1, wherein the compound of the formula NH₂—R is a cycloalkylamine of 5 to 12 carbon atoms.

10. The method of preparing N-substituted lactams as claimed in clain 1, wherein the compound of the formula NH₂—R is an arylamine of 6 to 8 carbon atoms.

11. The method of preparing N-substituted lactams as claimed in claim 1, wherein the compound of the formula NH$_2$—R is an aralkylamine of 7 to 10 carbon atoms.

References Cited in the file of this patent

UNITED STATES PATENTS

| | | |
|---|---|---|
| 2,301,964 | Martin | Nov. 17, 1942 |
| 2,415,645 | Lichtenwalter et al. | Feb. 11, 1947 |
| 2,923,738 | Williams et al. | Feb. 2, 1960 |
| 3,000,877 | Phillips et al. | Sept. 19, 1961 |
| 3,000,878 | Phillips et al. | Sept. 19, 1961 |
| 3,000,879 | Phillips et al. | Sept. 19, 1961 |
| 3,000,880 | Phillips et al. | Sept. 19, 1961 |

FOREIGN PATENTS

| | | |
|---|---|---|
| 580,034 | Canada | July 21, 1959 |

OTHER REFERENCES

Sidgwick: "Organic Chemistry of Nitrogen," 2nd edition, pages 155-6 (1937) (Oxford).

Degering: "An Outline of Organic Nitrogen Compounds," page 506 (University Lithoprinters) (1945).

Noller: "Chemistry of Organic Compounds," 2nd edition, pages 248-9, 252-5 (1957) (Saunders).

UNITED STATES PATENT OFFICE
CERTIFICATE OF CORRECTION

Patent No. 3,103,509            September 10, 1963

Otto von Schickh

It is hereby certified that error appears in the above numbered patent requiring correction and that the said Letters Patent should read as corrected below.

Column 4, line 45, for "taoms" read -- atoms --; line 50, for the claim reference numeral "2" read -- 1 --; line 73, for "clain 1" read -- claim 1 --.

Signed and sealed this 26th day of May 1964.

(SEAL)
Attest:

ERNEST W. SWIDER
Attesting Officer

EDWARD J. BRENNER
Commissioner of Patents